Figure 10:
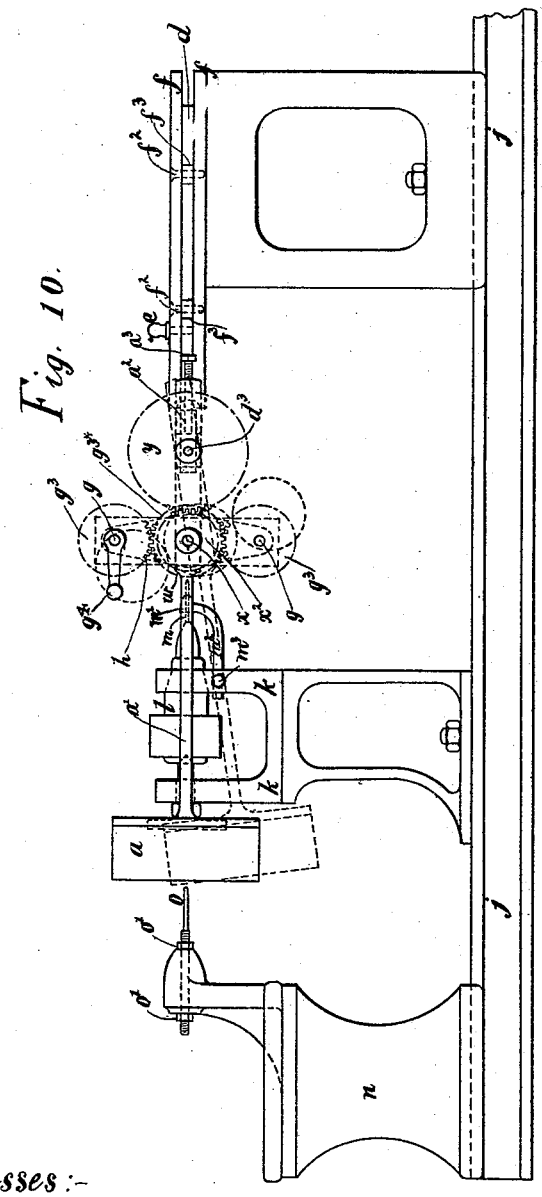

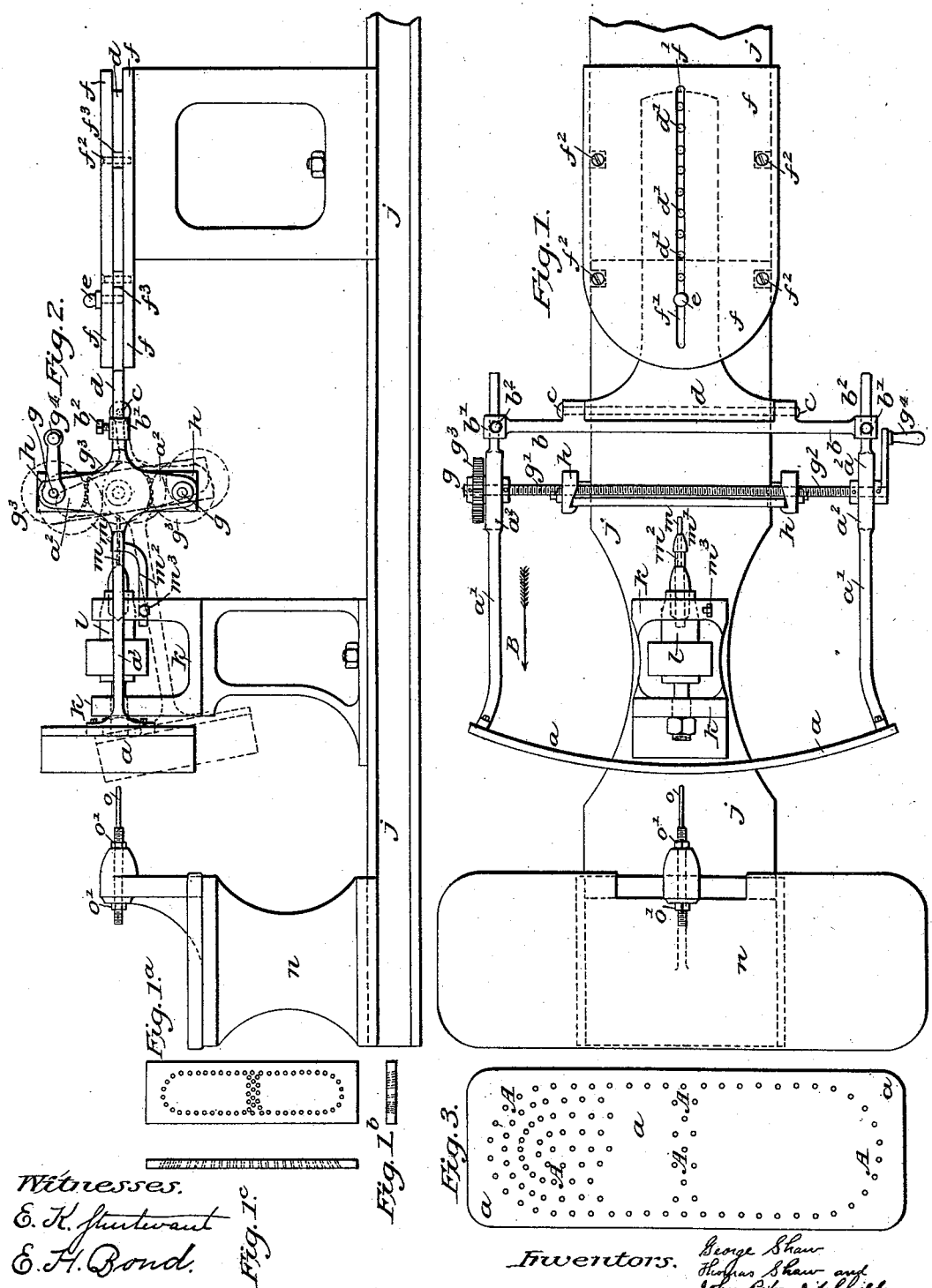

(No Model.) 8 Sheets—Sheet 2.
G. & T. SHAW & J. P. DITCHFIELD.
MACHINE FOR THE MANUFACTURE OF BRUSHES.
No. 471,709. Patented Mar. 29, 1892.
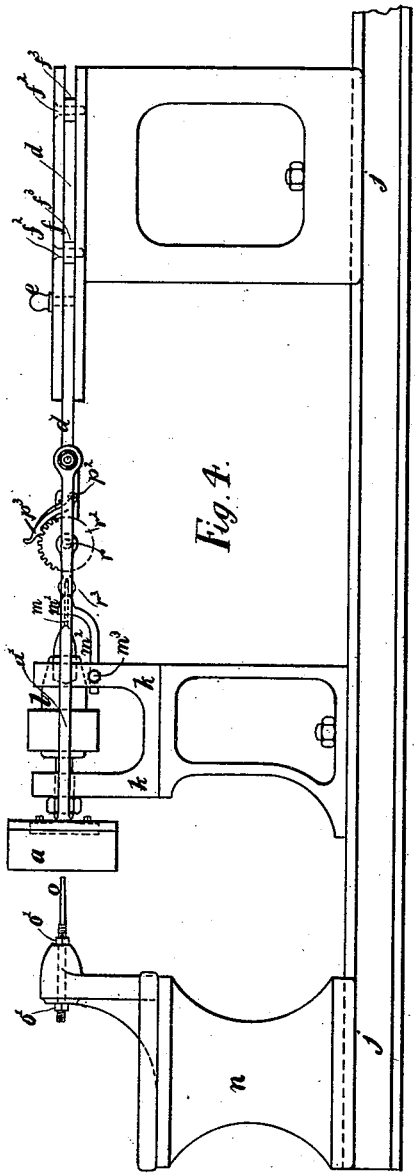
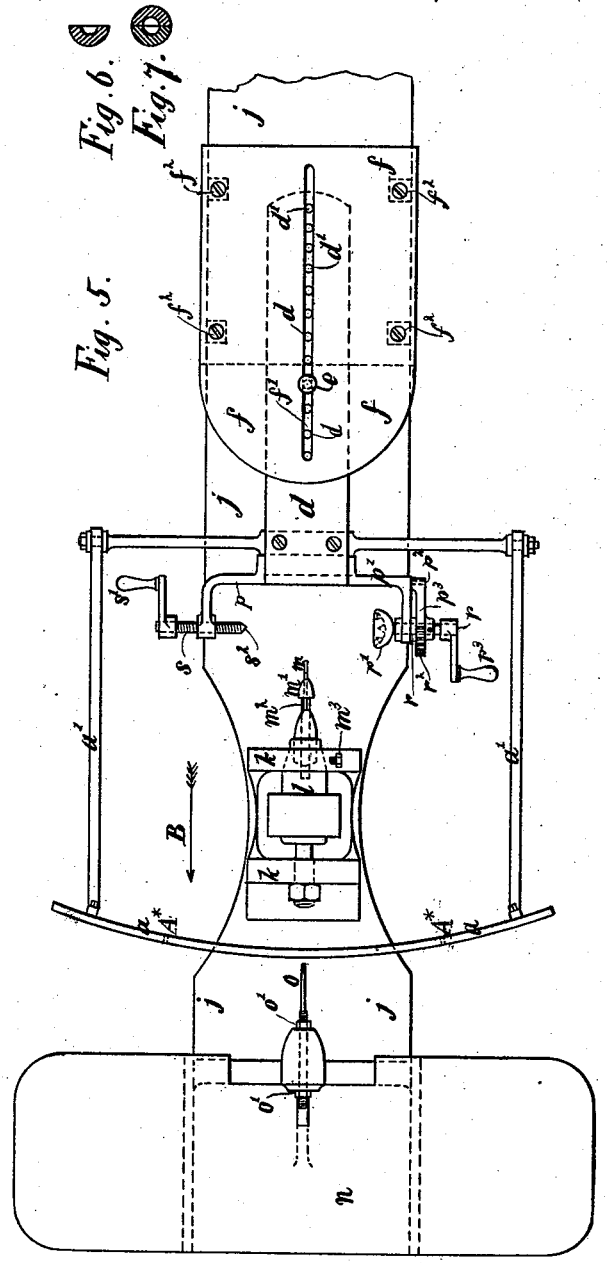
Witnesses:—
F. George Barry.
D. H. Hayward.
Inventors:—
George Shaw
Thomas Shaw and
John Peter Ditchfield
by their attorneys
Brown & Seward (No Model.) 8 Sheets—Sheet 3.
G. & T. SHAW & J. P. DITCHFIELD.
MACHINE FOR THE MANUFACTURE OF BRUSHES.
No. 471,709. Patented Mar. 29, 1892.
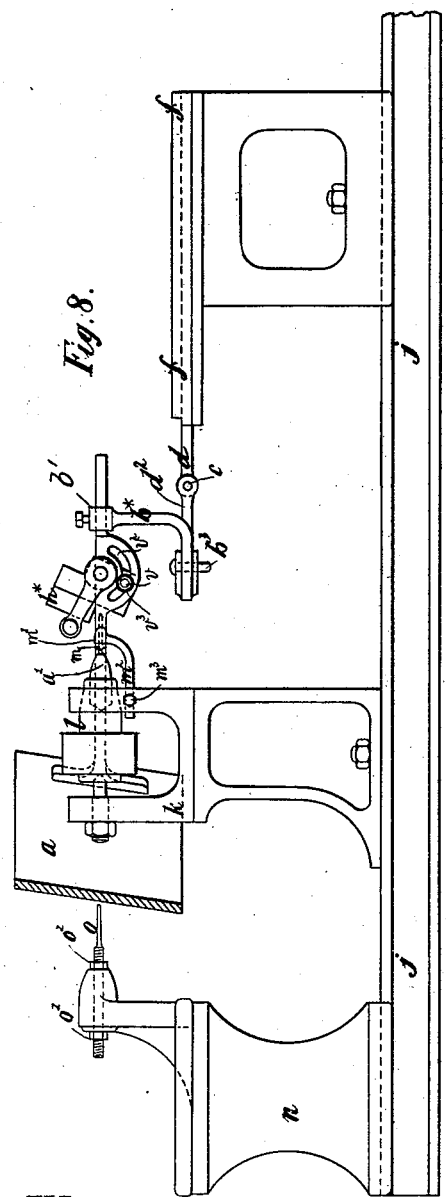
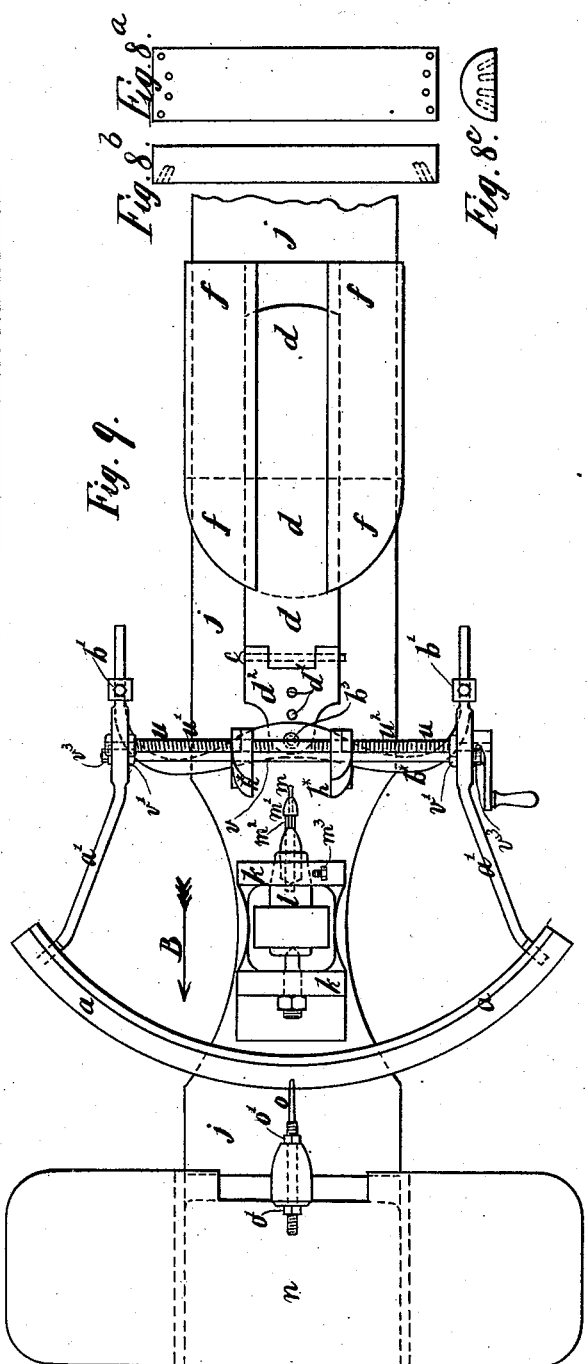

(No Model.) 8 Sheets—Sheet 4.

G. & T. SHAW & J. P. DITCHFIELD.
MACHINE FOR THE MANUFACTURE OF BRUSHES.

No. 471,709. Patented Mar. 29, 1892.

Witnesses:—
F. George Barry.
D. H. Hayward

Inventors:
George Shaw
Thomas Shaw
and John Peter Ditchfield
by their attorneys
Brown & Seward

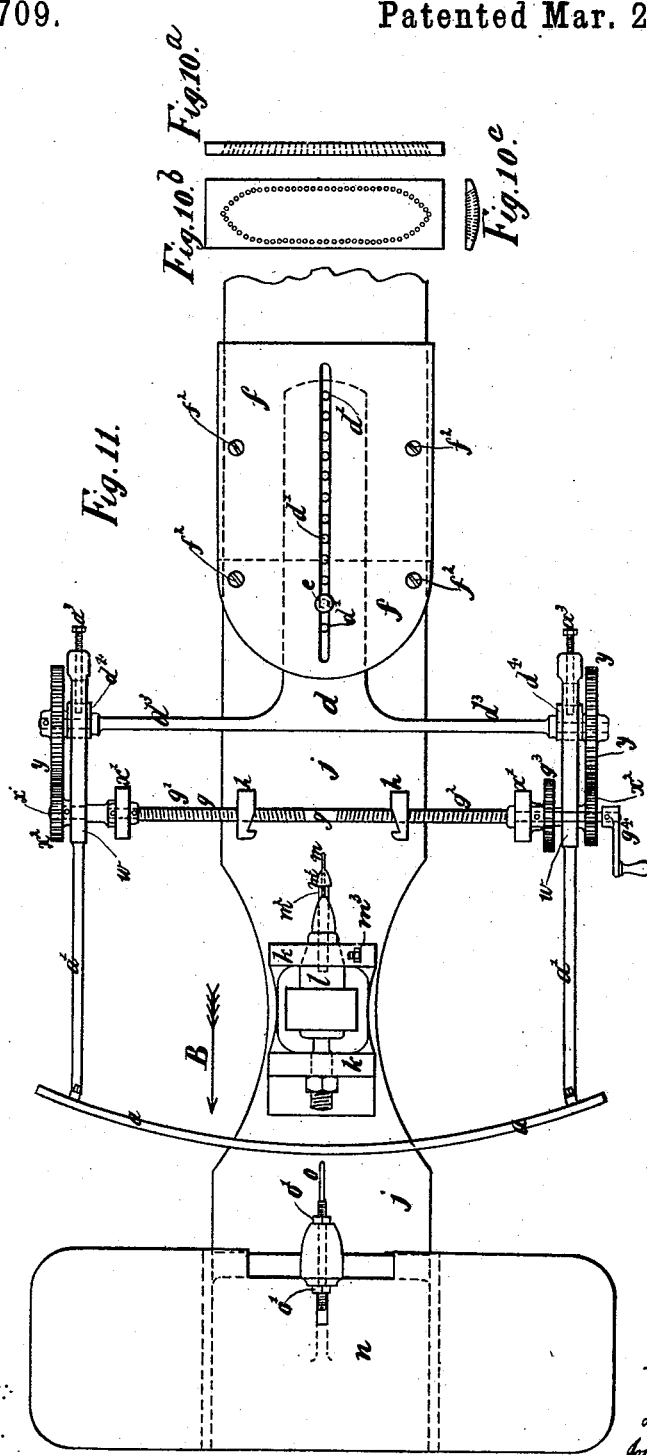

(No Model.) 8 Sheets—Sheet 6.
G. & T. SHAW & J. P. DITCHFIELD.
MACHINE FOR THE MANUFACTURE OF BRUSHES.
No. 471,709. Patented Mar. 29, 1892.
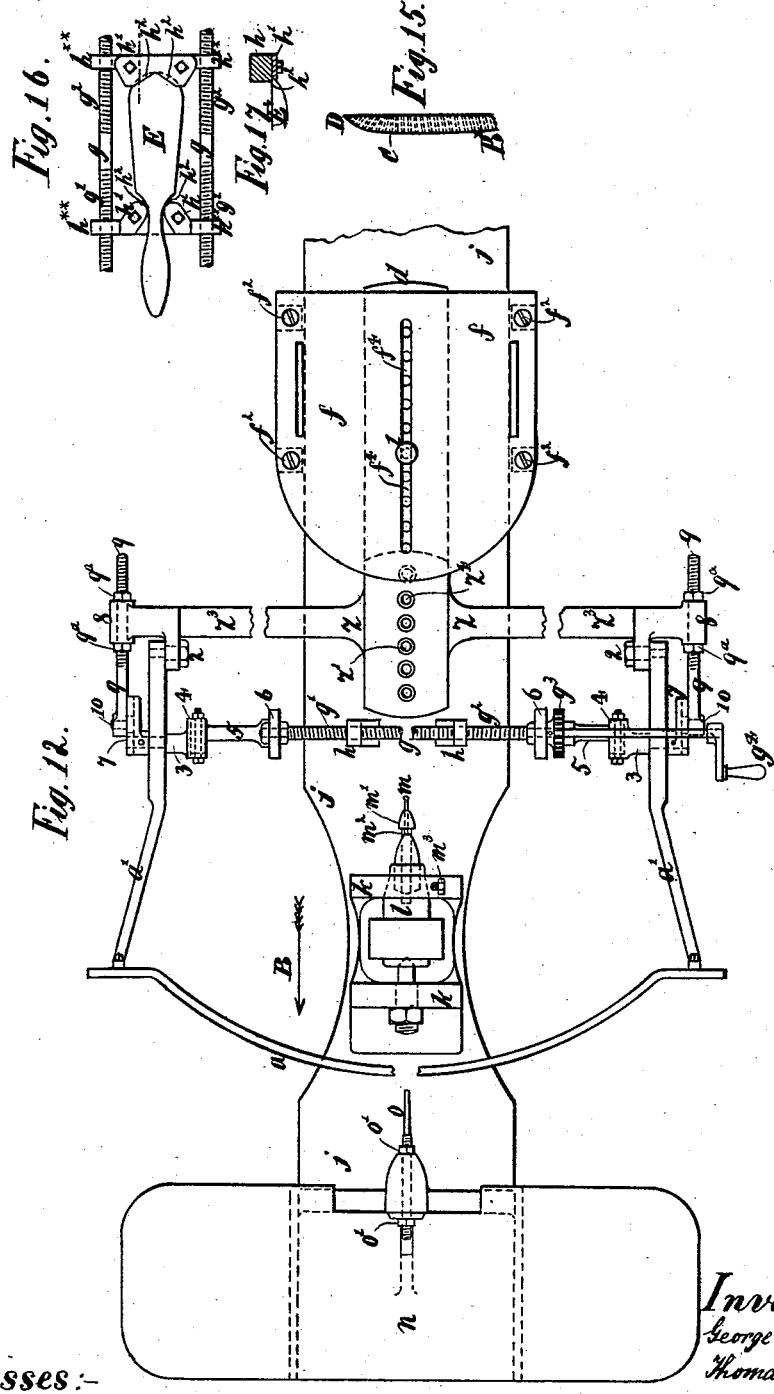
Witnesses:—
F. George Barry.
D. F. Hayward
Inventors
George Shaw
Thomas Shaw
John Peter Ditchfield
by their attorneys
Brown & Seward

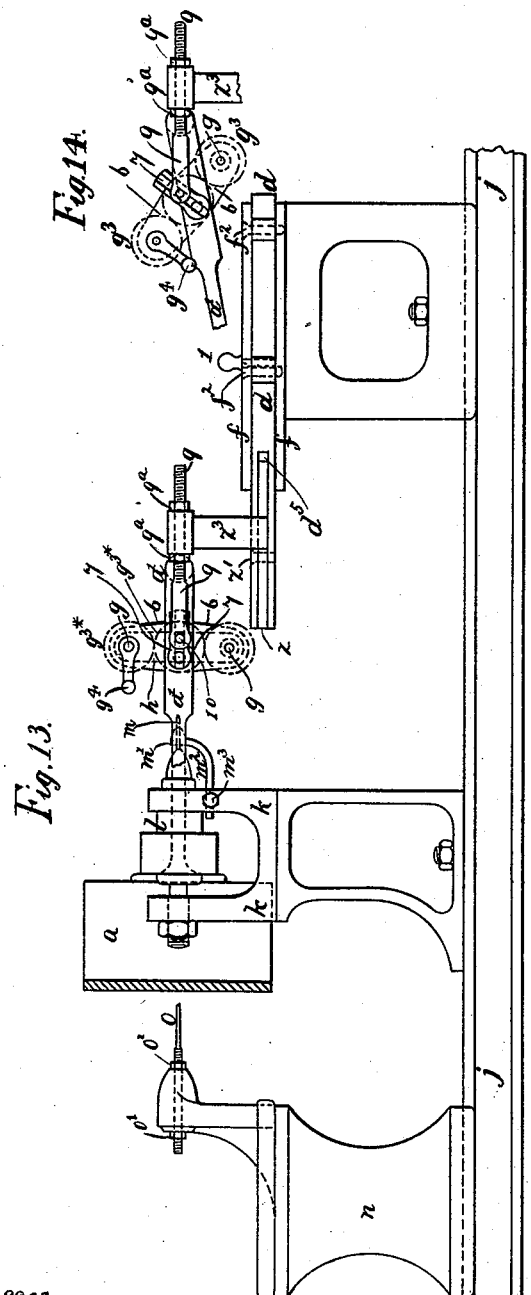

(No Model.) 8 Sheets—Sheet 8.
G. & T. SHAW & J. P. DITCHFIELD.
MACHINE FOR THE MANUFACTURE OF BRUSHES.
No. 471,709. Patented Mar. 29, 1892.
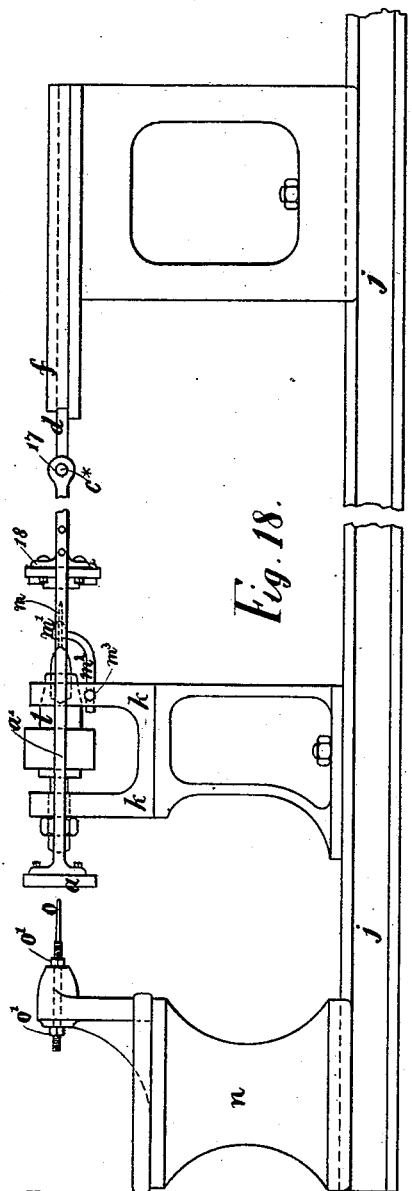
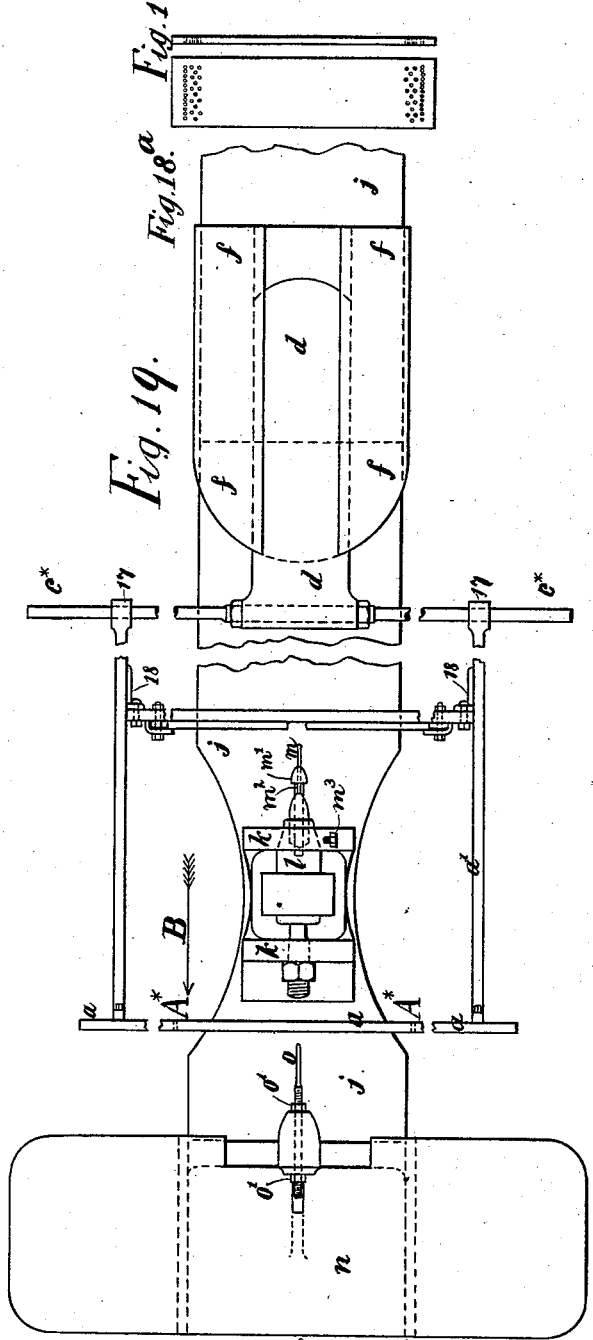

UNITED STATES PATENT OFFICE.

GEORGE SHAW, THOMAS SHAW, AND JOHN PETER DITCHFIELD, OF ASHTON-UNDER-LYNE, ENGLAND.

MACHINE FOR THE MANUFACTURE OF BRUSHES.

SPECIFICATION forming part of Letters Patent No. 471,709, dated March 29, 1892.

Application filed June 11, 1890. Serial No. 355,108. (No model.) Patented in England September 21, 1888, No. 13,639; in France August 20, 1889, No. 200,294; in Belgium August 21, 1889, No. 87,454, and in Germany August 23, 1889, No. 51,127.

*To all whom it may concern:*

Be it known that we, GEORGE SHAW and THOMAS SHAW, brush-manufacturers, both of Warre Street, Ashton-under-Lyne, in the county of Lancaster, England, and JOHN PETER DITCHFIELD, manager, of the same place, have invented certain new and useful Improvements in Machinery or Apparatus for the Manufacture of Certain Kinds of Brushes or Brooms, (for which we have obtained Letters Patent in Great Britain, No. 13,639, dated September 21, 1888; in France, No. 200,294, dated August 20, 1889; in Belgium, No. 87,454, dated August 21, 1889, and in Germany, No. 51,127, dated August 23, 1889;) and we hereby declare the following to be a full, clear, and exact description of the same.

Our invention relates to the manufacture of certain kinds of brushes and brooms; and it consists in arrangements of apparatus by means of which we are enabled to bore or drill with greater facility and accuracy of position than heretofore the holes in the boards or stocks for the reception of the tufts of bristles, fiber, bass, or other material of which the brush or broom is composed.

Our invention is illustrated in the accompanying drawings, in the various figures of which we shall apply to corresponding parts the same letters and figures of reference.

In the accompanying drawings, Figure 1 is a plan and Fig. 2 a side view of one of the machines constructed according to our invention. Fig. 3 is a front view of the templet used in connection with the machine illustrated by Figs. 1 and 2. Fig. 1$^a$ is a face view, Fig. 1$^b$ an end view, and Fig. 1$^c$ a side view, showing the form of brush board or stock in the drilling of the holes in which the machine shown in Figs. 1 and 2 is required. Fig. 4 is a side elevation, and Fig. 5 a plan, showing a machine for performing a further part of our invention. Fig. 6 is a cross-section of a brush board or stock of a certain kind, and Fig. 7 is a cross-section showing two brush boards or stocks of that kind secured together in order to be more conveniently bored or drilled. Figs. 8 and 9 are respectively an elevation and a plan of a machine constructed according to our invention and particularly adapted for drilling the end holes of certain brush boards or stocks. Fig. 8$^a$ is a face view, Fig. 8$^b$ a side view, and Fig. 8$^c$ an end view, of a brush-block serving to indicate the class of holes in the drilling of which the machine shown in Figs. 8 and 9 is required. Fig. 10 is an elevation, and Fig. 11 a plan, of a machine adapted for boring or drilling the brush boards or stocks in which it is desired that the holes bored or drilled in such brush boards or stocks shall have a considerable amount of "angle" or divergence. Fig. 10$^a$ is a side view, Fig. 10$^b$ a face view, and Fig. 10$^c$ an end view, showing the form of brush board or stock in the drilling of the holes in which the machine shown in Figs. 10 and 11 is required. Fig. 12 is a plan, and Fig. 13 an elevation, of another form of machine constructed according to our invention. Fig. 14 is a view illustrating the manner in which the position of certain parts is changed by the templet being depressed. Fig. 15 is a view illustrating the kind of brush board or stock to the drilling of the holes in which the machine shown in Figs. 12 and 13 is particularly adapted. Fig. 16 shows a method of holding in position while being drilled brush boards or stocks of a certain form, and Fig. 17 is a view showing a certain part detached. Fig. 18 is an elevation, and Fig. 19 a plan, of a machine particularly applicable to drilling the holes in brush boards or stocks in which the rows across the width have a slight amount of angle or divergence and in which the rows lengthwise of the brush boards or stocks are parallel. Fig. 18$^a$ is a face view, and Fig. 18$^b$ a side view, showing the form of brush board or stock in the drilling of the holes in which the machine shown in Figs. 18 and 19 is required.

According to the first part of our invention we employ a templet secured to arms which are capable of being moved longitudinally through sockets formed in a bar hinged or jointed to a plate or slide-bar, in which are formed holes, in any of which a pin or stud may be placed. The arms before mentioned may be secured in any desired position in the sockets through which they pass by means of set-screws or equivalents therefor. The plate or slide-bar above mentioned passes between fixed plates or guides, in each of which is formed a slot, through which and through a hole in the plate or slide-bar before referred to passes the pin or stud above mentioned. The plates aforesaid act as guides to prevent the plate or slide-bar from rotating and leave such plate or slide-bar at liberty to be turned upon the pin or stud while the said plate or slide-bar is being moved longitudinally between the fixed plates above referred to. Secured to or formed upon the arms before mentioned are brackets capable of revolving in and supported by which are shafts, upon which are formed right-hand screw-threads and left-hand screw-threads. The said right-hand screw-threads and left-hand screw-threads by means of suitable jaws cause the brush board or stock to be secured or held while being operated upon.

To the frame-work of the machine between the place where the brush board or stock is placed while being operated upon and the templet above referred to we fix a head-stock, in which is mounted a rotating spindle, which carries the drill employed to form the holes in the brush board or stock to be operated upon. Projecting from a bracket secured to the frame-work of the machine and in front of the templet previously referred to is a projecting stud or pin. In the templet above mentioned we form holes corresponding in position and arrangement to the holes to be formed in the brush board or stock to be operated upon. The brush board or stock to be operated upon is secured to the arms above mentioned by means of the screws and jaws above referred to. The attendant then places one of the holes in the templet upon the projecting stud or pin above mentioned and draws or slides the templet along such stud or pin. The movement of the templet and parts connected thereto will cause the brush board or stock to be operated upon by the drill, the depth of the hole drilled being regulated by a stop. The templet above mentioned may contain as many holes as are to be formed or drilled in the brush board or stock, or the templet may only contain holes corresponding in position and arrangement to a portion of the holes to be formed in the brush board or stock, the remaining holes in the brush board or stock being formed by a subsequent operation.

The tufts of bristles, fiber, bass, or other material of which the brush or broom is composed we shall for convenience hereinafter refer to as the "tufts of bristles."

In the accompanying drawings, Fig. 1 is a plan and Fig. 2 a side view of one of the machines constructed according to our invention.

According to the first part of our invention we employ a templet $a$, secured to arms $a'$, which are capable of being moved longitudinally through sockets $b'$, formed in a bar $b$, hinged or jointed by a rod $c$ to a plate or slide-bar $d$, in which are formed holes $d'$, in any one of which a pin or stud $e$ may be placed.

The arms $a'$ may be secured in any desired position in the sockets $b'$ by means of set-screws $b^2$ or equivalents therefor.

The arms $a'$ and bar $b$ form a frame, which carries the templet $a$ and clamp $h$ or other clamping device, to be hereinafter described, constituting a holder for the brush board or stock. The plate or slide-bar $d$ passes between fixed plates or guides $f$, in each of which is formed a slot $f'$, through which and through one of the holes $d'$ is passed the pin or stud $e$. The plates or guides $f$ act as guides to prevent the plate or slide-bar $d$ from rotating and leave such plate or slide-bar $d$ at liberty to be turned horizontally upon the pin or stud $e$ while the plate or slide-bar $d$ is being moved longitudinally between the plates or guides $f$. The plates or guides $f$ are secured together by means of the screws $f^2$, which pass through washers or thimbles $f^3$, by which the plates or guides $f$ are prevented from binding upon the plate or slide-bar $d$.

Secured to or formed upon the arms $a'$ are brackets $a^2$, carried by which and capable of being revolved therein are shafts $g$, upon each of which are formed right-hand screw-threads $g'$ and left-hand screw-threads $g^2$. Mounted upon the shafts $g$ and acted upon by the screw-threads $g'$ $g^2$ are jaws $h$, which may vary in form and size, according to the shape of the board to be held by them. The shafts $g$ are geared together by means of wheels $g^3$, so that when one of the shafts $g$ is turned by means of the handle $g^4$ the other shaft $g$ will also be turned. The brush board or stock to be operated upon is placed between the jaws $h$, and the handle $g^4$ being turned the screw-threads $g'$ $g^2$ will cause the said brush board or stock to be firmly held between the jaws $h$. The right-hand screw-threads $g'$ and left-hand screw-threads $g^2$ cause each brush board or stock being operated upon to be held midway between the arms $a'$, although the brush boards or stocks may not be of a uniform length.

To the frame-work or bed $j$ of the machine and between the brush-board or stock being operated upon and the templet $a$ we fix a head-stock $k$, in which is mounted a rotating spindle $l$, which carries the drill $m$, employed to form the holes in the brush board or stock to be operated upon.

Projecting from a bracket $n$, secured to the frame-work $j$ of the machine and in front of the templet $a$, is a projecting pin or stud $o$. In the templet $a$ we form holes A, as shown in Fig. 3, which is a front view of the templet $a$. The holes A correspond in position and arrangement to the holes to be formed or drilled in the brush board or stock to be operated upon. The brush board or stock to be operated upon is secured to the arms $a'$ by means of the shafts $g$ and jaws $h$. The projecting pin or stud $o$ is so adjusted by the nuts $o'$ and screw-threads that when one of the holes A', formed through the templet $a$, is placed upon the projecting pin or stud $o$ and slid longitudinally thereon in the direction indicated by the arrow B such pin or stud $o$ will act as a guide and support for the templet $a$.

$m'$ is a stop formed with the shank $m^2$, which passes through a hole formed in the head-stock $k$ and may be secured therein by means of a set-screw $m^3$. The stop $m'$ is so adjusted relatively to the point of the drill $m$ that when the surface of the brush board or stock arrives against the stop $m'$ the hole drilled in such brush board or stock will be of the depth required.

The attendant places one of the holes A in the templet $a$ upon the projecting pin or stud $o$ and draws or slides the templet $a$ along the stud or pin $o$. The movement of the templet $a$ and the parts connected thereto will cause the brush board or stock to be operated upon by the drill $m$, the depth of the hole formed in the brush board or stock being regulated by the stop $m'$. The attendant repeats the above-described operation until the desired number of holes has been drilled in the brush board or stock, and then, turning the handle $g^4$, releases the brush board or stock and replaces it by another to be operated upon.

The templet $a$ may contain as many holes A as are to be formed or drilled in the brush board or stock, or the templet $a$ may only contain holes corresponding in position and arrangement to a portion of the holes to be formed in the brush board or stock, the remaining holes in the brush board or stock being formed by a subsequent operation. The slots $f'$ allow the templet $a$ and parts connected therewith to be moved in the direction of the length of the machine.

The templet $a$, arms $a'$, jaws $h$, and the brush board or stock being operated upon can be turned upon the rod $c$, as indicated by the dotted lines in Fig. 2. The movement of the arms $a'$ upon the pin or stud $e$ and upon the rod $c$ will cause the holes drilled in the brush board or stock to be drilled at an angle, in order that the required "spread" may be given to the bristles or other fiber or material subsequently inserted in the holes formed in the brush board or stock. When the pin or stud $e$ is placed in a hole $d'$ farther away from the templet $a$, the holes drilled in the brush board or stock will be drilled more nearly parallel to each other than when the pin or stud $e$ is placed in a hole $d'$ nearer to the templet $a$. By the set-screws $b^2$ being slackened and the templet $a$ and jaws $h$ being adjusted in position so as to be farther from the axis of the rod $c$ the holes drilled in the brush board or stock will be drilled more nearly parallel to each other in planes at right angles to the rod $c$ than when the templet $a$ and jaws $h$ are placed nearer to the axis of the rod $c$. By the templet $a$ and jaws $h$ being adjusted in position so as to be nearer to or farther from the axis of the rod $c$ and the pin or stud $e$ being placed in one or other of the holes $d'$, holes may be caused to be so drilled or formed in the brush board or stock as to give a greater or less amount of spread to the bristles, bass, or other fiber forming the brush or broom, as may be desired.

The machine illustrated by Figs. 1 and 2 is intended to be employed for drilling brush boards or stocks in which the holes require to have only a small degree of angle or divergence.

Figs. $1^a$, $1^b$, and $1^c$ show the form of brush board or stock in the drilling of the holes in which the machine shown in Figs. 1 and 2 is required.

In drilling or forming the holes in brush boards or stocks of a rounded or curved form we secure the brush board or stock to be operated upon between jaws, which may be placed at an angle or rotated, or we mount the brush board or stock between supports, one or both of which may be placed at an angle or rotated. We cause the amount of turning or rotation imparted to the brush board or stock to be determined by means of a dividing disk or plate provided with a suitable catch, by means of which the dividing disk or plate or brush board or stock is prevented from being turned except when required. By the brush board or stock being placed nearer to or farther from the templet or by the pin above mentioned which slides in the slot above referred to being placed nearer to or farther from the brush board or stock the angle or divergence of the holes may be made greater or less, as may be desired. A machine arranged for performing this portion of our invention is illustrated by Figs. 4 and 5 of the accompanying drawings. As certain parts of the machine illustrated by Figs. 4 and 5 are similar in construction and operation to some of the parts shown in Figs. 1 and 2, we shall apply to such parts the same letters and figures of reference as are applied to the corresponding parts in Figs. 1 and 2. The machine illustrated in Figs. 4 and 5 is especially arranged for drilling the holes to receive the bristles, fiber, bass, or other material of which the brush or broom is formed in circular or cylindrical brushes or brooms, in which the surface in which the bristles, fiber, bass, or other material are or is secured is circular or of a circular section. Secured to the plate or slide-bar $d$ are brackets $p$ $p'$. Carried by the bracket $p'$ and capable of being rotated therein is a spindle $r$. Fast upon the spindle $r$ is a cup $r'$, having projecting from its surface pins or spikes. Fast upon the spindle $r$ is a toothed wheel $r^2$. Secured to the bracket $p'$ is a stud $p^2$, and mounted upon such stud $p^2$ is a click or catch $p^3$. The wheel $r^2$ and click or catch $p^3$ constitute a "dividing apparatus." Fast upon the spindle $r$ is a handle $r^3$, by which the spindle $r$ may be turned. Carried by and free to be turned in the bracket $p$ is a screwed spindle $s$, which is provided with a handle $s'$, by means of which the spindle $s$ may be turned. The spindle $s$ is formed with a conical point $s^2$.

The brush board or stock to be operated upon is placed between the cup $r'$ and the point $s^2$. The screwed spindle $s$ is then turned by means of the handle $s'$, so that the brush board or stock will be firmly held between the point $s^2$ and the pins or spikes with which the cup $r'$ is provided. The cup $r'$ assists in holding the brush board or stock in the true position for being operated upon. Through the templet $a$ are formed holes $A^*$, corresponding in arrangement with the holes to be drilled in the brush board or stock to be operated upon. After one row of holes extending in the direction of the length of the brush board or stock has been drilled the click or catch $p^3$ is raised clear of the teeth of the wheel $r^2$ and the spindle $r$ and brush board or stock are turned by means of the handle $r^3$ through the angular distance necessary to bring the brush board or stock into the required position for having another row of holes formed therein. When the brush board or stock has been turned to the desired position, it is retained therein by the click or catch $p^3$. In those cases in which the machine is to be employed for drilling the holes in brush boards or stocks of a semicircular section, such as is shown in Fig. 6, the brush boards or stocks may be secured together back to back in pairs, as shown in Fig. 7, so that two of such semicircular brush boards or stocks may be drilled as one circular brush, in which form they are drilled more readily and cheaply than they would be separately.

According to another arrangement of our invention we employ a frame and templet similar to that above mentioned, which frame is provided with a cross-bar, which is capable of being moved upon a flat bar in which are formed a number of holes. The cross-bar and the flat bar above mentioned are secured together by means of a pin, which passes through a hole in the cross-bar and one of the holes formed in the flat bar above mentioned. The flat bar above mentioned is jointed or hinged to a bar or plate capable of being slid longitudinally between guides secured to the frame-work of the machine. A machine constructed according to this arrangement of our invention is shown in Figs. 8 and 9 of the accompanying drawings. Fig. 8 is an elevation, and Fig. 9 a plan, of a machine constructed according to our invention and particularly adapted for drilling the "end holes" of certain brush-boards or stocks, which holes require to be drilled at a considerable angle to the other holes drilled in the brush board or stock and also require to have a considerable amount of angle, divergence, or spread. Figs. $8^a$, $8^b$, and $8^c$ serve to indicate the class of holes in the drilling of which the machine shown in Figs. 8 and 9 is required. To such of the parts shown in Figs. 8 and 9 as correspond to parts shown in Figs. 1, 2, 4, and 5 we shall apply the same letters and figures of reference as are applied to the corresponding parts in Figs. 1, 2, 4, and 5. The arms $a'$, carrying the templet $a$, pass through sockets $b'$, formed upon a bar or frame $b^*$, capable of being turned horizontally upon a flat bar or plate $d^2$, to which the bar or frame $b$ is jointed by means of a pin $b^3$, which is passed through one of a series of holes $d'$, formed in the flat bar or plate $d^2$. The flat bar or plate $d^2$ is jointed or hinged by means of a rod $c$ to a bar or plate $d$, capable of being slid longitudinally between guides $f$, secured to a bracket fastened to the frame-work $j$ of the machine. Supported by the arms $a'$ is a shaft $u$, upon which are formed right-hand screw-threads $u'$ and left-hand screw-threads $u^2$, upon which are mounted jaws $h^*$. Passing through the jaws $h^*$ is a bar $v$, upon which are formed collars $v'$. The ends of the bar $v$ pass through curved slots $v^2$, formed in parts, each formed on one of the arms $a'$. The bar $v$ is provided with nuts $v^3$, by means of which its ends may be secured in any desired position in the slots $v^2$. The nuts $v^3$ being slackened, the jaws $h^*$ and bar $v$ are turned around the shaft $u$ until the jaws $h^*$ are in the position for presenting the brush board or stock to be operated upon in the required position to the drill $m$. The bar $v$ is then secured in the slots $v^2$ by means of the nuts $v^3$. The face of the templet $a$ is placed at an angle to the bar $v$ and parallel, or nearly so, to the portion of the brush board or stock in which holes are to be drilled. By mounting the jaws $h^*$ over or nearly over the pin $b^3$, upon which the bar or frame $b$ turns, and placing the rod $c$, by which the flat bar or plate $d^2$ is hinged or jointed to the bar or plate $b$ near to the pin $b^3$, we are enabled to obtain the divergence or spread of the holes which is necessary to give the required degree of divergence or spread to the tufts of bristles placed in the extremity or extremities of certain kinds of brushes or brooms—such, for instance, as stove-brushes, scrubbing-brushes, and brooms.

A further portion of our invention consists in apparatus by means of which we are enabled to bore or drill the brush boards or stocks in which it is desired that the holes bored or drilled in such brush boards or stocks shall have a considerable amount of angle or divergence. In the frame or arm to which the templet previously referred to is secured we mount a bar or shaft, a portion of which is formed with a hollow or cavity, in which the brush board or stock to be drilled or bored is placed and secured thereto by means of a screw and suitable clamps and jaws. Fast upon the bar or shaft is mounted a toothed sector, the teeth of which gear into the teeth of a toothed sector mounted fast upon the slide or bar upon which turns the arm or frame to which is secured the templet and the brush board or stock to be operated upon. When the arm or frame is moved into the position required when drilling the holes along the sides of the brush board or stock, such moving of the arm or frame will by means of the toothed sectors cause the shaft or bar to which the brush board or stock is secured to be turned through a portion of a revolution, thereby causing the holes drilled or bored to have a considerable amount of angle or divergence. The angle or divergence of the holes drilled or bored in the brush board or stock may be increased or diminished by employing toothed sectors of suitable radius.

Figs. 10 and 11 show a machine constructed according to this portion of our invention. Figs. $10^a$, $10^b$, and $10^c$ show the form of brush board or stock in the drilling of the holes in which the machine shown in Figs. 10 and 11 is required. As parts of the machine shown in Figs. 10 and 11 are similar in construction and operation to parts of machines hereinbefore described, we shall apply to such parts the same letters and figures of reference as have been applied to the corresponding parts hereinbefore described and shall not describe such parts further than may be necessary in describing the construction and operation of the other parts used in conjunction therewith. Upon the arms $a'$, to which is secured the templet $a$, are formed bosses $w$, passing through which and capable of being turned therein is a shaft $x$, upon which shaft $x$ are formed or secured brackets $x'$. Carried by the brackets $x'$ and capable of being rotated therein are shafts $g$, upon which are formed right-hand screw-threads $g'$ and left-hand screw-threads $g^2$. Upon the screw-threads $g'$ $g^2$ and acted upon thereby are jaws or clamps $h$. Fast upon one end of each of the shafts $g$ is a toothed wheel $g^3$, which gears into a wheel $g^{3*}$, mounted so as to be free to turn on the shaft $x$. Fast upon one of the shafts $g$ is a handle $g^4$. By the said shaft $g$ being turned by means of the handle $g^4$ motion will by means of the wheels $g^3$ $g^{3*}$ $g^3$ be transmitted to the other shaft $g$ and the jaws or clamps $h$ may be caused to approach toward or recede from each other. Fast with the plate or slide-bar $d$ are arms $d^3$, mounted upon which and free to turn thereon are steps $d^4$. In the arms $a'$ are formed slots $a^2$, in which are situate the steps $d^4$, upon which the slots $a^2$ may at times be slid by means of screws $a^3$, passing through the arms $a'$. Fast upon the arms $d^3$ are wheels $y$, which gear into wheels $x^2$, fast upon the shaft $x$. When the templet $a$ and arms $a'$ are turned upon the arms $d^3$, the wheels $x^2$, shaft $x$, and brackets $x'$ will be turned through a portion of a revolution around the axis of the shaft $x$, so that the holes drilled in the brush board or stock will be caused to have a considerable angle or divergence. The divergence of the holes drilled or bored in the brush board or stock may be increased or diminished by employing toothed wheels $x^2$ $y$ of suitable diameter, the arms $d^3$ being adjusted in relation to the shaft $x$ as may be necessitated by the diameters of the wheels $x^2$ $y$, placed upon the shaft $x$ and arms $d^3$. For convenience of construction we place toothed wheels—such as $x^2 y$—upon the shaft $x$ and arms $d^3$, the operative portions of such wheels constituting toothed sectors; but, if desired, toothed sectors may be employed in place of the toothed wheels $x^2$ $y$.

Fig. 12 is a plan, and Fig. 13 an elevation, of another arrangement of machine constructed according to this portion of our invention. In Figs. 12 and 13 to parts corresponding to those above described are applied the same letters of reference as are applied to the corresponding parts above described. $d$ is a plate or slide-bar capable of being slid between the fixed plates $f$. Edgewise through the plate or slide-bar $d$ is formed a slot $d^5$, situate in which and capable of being turned horizontally therein is a plate or bar $z$. Through the plate or slide-bar $d$ are formed holes, in any one of which is placed a pin 1, capable of being slid in a slot $f^4$, formed in one of the fixed plates $f$. Through the plate or bar $z$ are formed holes, in any one of which a pin $z'$ may be placed. Formed upon the plate or bar $z$ are arms $z^3$, upon which are formed projecting parts, through which are screwed set-screws 2, the ends of which form pivots upon which the arms $a'$ may be turned. To the arms $a'$ is secured the templet $a$. Carried by the arms $a'$ and capable of being turned therein are short spindles 3, in each of which is formed a box 4, into which passes one end of a stud 5, projecting from a bracket 6. Carried by the brackets 6 and capable of being turned therein are shafts $g$, upon each of which are formed right-hand screw-threads $g'$ and left-hand screw-threads $g^2$. Mounted upon and acted upon by the screw-threads $g'$ $g^2$ are jaws $h$. Fast upon each of the shafts $g$ is a wheel $g^3$, which gears into a wheel $g^{3*}$, mounted loose upon one of the studs 5. By means of the handle $g^4$, fast upon one of the shafts $g$, the shafts $g$ may be turned. Fast upon each of the spindles 3 is an arm 7, in which is formed a slot. Upon the arms $z^3$ are formed bosses 8, through each of which passes a rod 9. Upon each of the rods 9 are formed screw-threads. The rods 9 are capable of being adjusted longitudinally in the bosses 8, and after adjustment may be secured in position by means of nuts $9^a$. Each of the rods 9 is provided with a pivot 10, which projects into the slot formed in one of the arms 7, fast upon one of the spindles 3. When the arms $a'$ and templet $a$ are turned upward or downward upon the pivots formed by the set-screws 2, the movement of the arms $a'$ and templet $a$ will cause one side or the other of the slot in each of the arms 7 to arrive against the pivot 10, projecting into such slot, and thereby cause the spindles 3 to be turned. By adjusting the rods 9 by means of the nuts $9^a$ so that the studs 10 are nearer to or farther from the axes of the spindles 3 the spindles 3 may be caused to be turned in a greater or less degree by a given movement of the arms $a'$ and templet $a$ and the divergence of the holes drilled in the brush-board or stock across the width of the brush board or stock may be made greater or less, as may be desired.

Fig. 14 is a view of certain parts illustrating the manner in which the position of the brush board or stock is changed by the templet $a$ being depressed.

The arrangement of machine shown by Figs. 12 and 13 is particularly applicable for drilling the holes in brush boards or stocks having the form shown in the detached view Fig. 15. This is the example of our invention to which we attach most importance. When the holes in the portion of the brush board or stock between the points $B^*$ and C are being drilled, the arms $z^3$ are fixed to the plate or slide-bar $d$ by the pin $z'$ and a pin $z^4$ passed through one of the holes in the plate or slide-bar $d$, the plate or slide-bar $d$ being then free to move upon the pin 1, situate in the slot $f^4$ and one of the holes formed in the plate or slide-bar $d$. When the holes in the portion of the brush board or stock between the points C and D are to be drilled, another pin 1 is passed through the slot $f^4$ and into one of the holes formed in the plate or slide-bar $d$, so that the plate or slide-bar $d$ can only be moved in the direction of its length, and the plate or bar $z$ is secured to the plate or slide-bar $d$ by means of one pin $z'$, passed through one of the holes in the plate or slide-bar $d$ and one of the holes in the plate or bar $z$, the pin $z^4$ being removed.

By the arrangement of machine shown in Figs. 12 and 13 we are enabled to drill the holes in a brush board or stock so that the holes in one portion of the brush board or stock will have a greater or less degree of divergence than the holes in another portion of the brush board or stock.

Fig. 16 shows one method of holding in position while being drilled brush boards or stocks of a form such as that shown at E and of forms similar thereto. To bars $h^{}$, which are caused to approach toward or recede from each other by the right-hand screw-threads $g'$ and left-hand screw-threads $g^2$, we secure plates $h'$, which plates $h'$, in conjunction with the bars $h^{}$, form angular recesses $h^2$, as shown in Fig. 17, which angular recesses $h^2$, when the bars $h^{**}$ are caused to approach each other, retain the brush board or stock to be operated upon in position while being drilled. The plates $h'$ are formed so that they will securely hold the brush board or stock to be operated upon while such brush board or stock is being drilled.

According to a further part of our invention we employ a frame provided with a templet, as above described. In one end of each of the arms of such frame are formed holes, which are passed upon a bar or rod or bars or rods formed upon or secured to a plate or bar capable of being slid longitudinally between guides secured to the frame-work of the machine. The frame above mentioned is capable of being turned upon a bar or rod or bars or rods before mentioned and may also be slid longitudinally upon the said bar or rod or bars or rods. This arrangement of our invention is particularly applicable to brush boards or stocks in which the rows across the width have a slight amount of angle or divergence and in which the rows lengthwise of the brush boards or stocks are parallel. A machine constructed according to this part of our invention is illustrated by Figs. 18 and 19 of the accompanying drawings. Figs. $18^a$ and $18^b$ show the form of brush board or stock in the drilling of the holes in which the machine shown in Figs. 18 and 19 is required. As certain parts of the machine illustrated by Figs. 18 and 19 are similar in construction and operation to similar parts employed in the machines previously referred to, we shall affix to such parts the same letters and figures of reference as we have applied to the corresponding parts above described. Secured to the slide-bar or plate $d$ is a rod $c^*$. The arms $a'$ are provided with sockets 17, which are capable of being turned and slid longitudinally upon the rod $c^*$. Secured to the arms $a'$ is the templet $a$, which in the machine now being described is straight. The brush board or stock to be operated upon is fastened to brackets 18, secured to or formed upon the arms $a'$. As the movement of the templet $a$ in the direction of the axis of the rod $c^*$ and the movement in the same direction of the brush board or stock being operated upon are equal, the holes in each horizontal row of holes drilled in the brush board or stock will be the same distance apart as the corresponding holes $A^*$ in the templet $a$; but the horizontal rows of holes drilled in the brush board or stock may be caused to be nearer together or farther apart, according as the brush board or stock is placed farther from or nearer to the axis of the rod $c^*$. The turning of the arms $a'$ upon the rod $c^*$ will cause the rows of holes across the width of the brush board or stock to have a slight amount of angle or divergence. We have for convenience of illustration shown the arms $a'$ and templet $a$ as broken. The templet $a$ will require to be of sufficient length and breadth to contain as many holes as are to be drilled or formed in the brush board or stock to be operated upon. The arms $a'$ will require to be of such length that the templet $a$ and the brush board or stock may be placed at such a distance from the axis of the rod $c^*$ that the holes forming the vertical rows of holes drilled or formed in the brush board or stock will have only a small amount of angle or divergence in a direction at right angles to the length of the brush board or stock.

By means of our invention we are enabled to employ one templet in the drilling of brush boards or stocks of various sizes and in the drilling of holes of various sizes.

What we claim, and desire to secure by Letters Patent, is—

1. In a machine for drilling holes in brush boards or stocks in which the brush board or stock to be drilled is moved toward or away from the drill, the combination, with a templet and a holder for the brush board or stock, of a frame in which the templet and said holder are both contained, arranged to move always in the same direction, a drill-stock and a drill therein arranged between the said templet and holder, and a fixed guide-pin arranged substantially in line with the drill on the opposite side of the templet and fitting holes in the latter for the purpose of guiding the brush board and stock to the drill.

2. In a machine for drilling the holes in brush boards or stocks, the combination of the templet $a$, the arms $a'$, the rods 9, the studs 10, arms 7, provided with slots, and the spindles 3, substantially as herein described, whereby when the arms $a'$, which carry the templet, are moved the brush board or stock will be turned so that each hole may be drilled in the required position, as herein set forth.

3. In a machine for drilling the holes in brush boards or stocks, the combination of the templet $a$, arms $a'$, plate or slide-bar $d$, plate or bar $z$, mounted in the plate or slide-bar $d$ and provided with arms $z^3$, upon which the arms $a'$ are hinged or mounted, the rods 9, provided with pivots 10, the arms 7, the spindles 3, the shafts $g$, the jaws $h$, the fixed plates or guides $f$, the pins $f^4$ and $z'$, the head-stock $k$, the spindle $l$, drill $m$, stop $m'$, and the stud or pin $o$, all constructed, arranged, employed, and operating substantially as and for the purposes hereinbefore described.

GEORGE SHAW.
THOMAS SHAW.
JOHN PETER DITCHFIELD.

Witnesses:
ARTHUR T. HALL,
HENRY BLAIR,
 9 *Mount St., Manchester.*